United States Patent
Kinomura et al.

(10) Patent No.: US 9,660,545 B2
(45) Date of Patent: May 23, 2017

(54) MATRIX CONVERTER

(71) Applicant: KABUSHIKI KAISHA YASKAWA DENKI, Kitakyushu-shi (JP)

(72) Inventors: Hirofumi Kinomura, Kitakyushu (JP); Joji Ebisu, Kitakyushu (JP); Koji Iwahashi, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 297 days.

(21) Appl. No.: 14/513,216

(22) Filed: Oct. 14, 2014

(65) Prior Publication Data

US 2015/0102797 A1    Apr. 16, 2015

(30) Foreign Application Priority Data

Oct. 15, 2013   (JP) .................. 2013-214746

(51) Int. Cl.
*H02M 5/293* (2006.01)
*H02M 5/297* (2006.01)

(52) U.S. Cl.
CPC ........... *H02M 5/293* (2013.01); *H02M 5/297* (2013.01)

(58) Field of Classification Search
CPC .............. G11B 20/24; G11B 33/1493; H03M 2201/64; H04B 10/697; H02H 7/0838; H04M 3/18; H02P 2201/07; H02P 2201/09; H02P 2201/15; H02P 6/085; H02P 7/04; H02P 27/16; H02P 5/74; H02P 23/26; H02P 23/07; B60L 7/10; B60L 7/22; H02M 5/293; H02M 5/257; H02M 5/04; H02M 5/02; H02M 5/253; H02M 5/2573;

(Continued)

(56) References Cited

U.S. PATENT DOCUMENTS

2009/0322276 A1* 12/2009 Yamanaka ............ H02M 5/293
                                                        318/811

FOREIGN PATENT DOCUMENTS

JP    2001-061276    3/2001
JP    2004-364477    12/2004

OTHER PUBLICATIONS

She et al., "Implementation of Voltage-Based Communication in Space-Vector-Modulated Matrix Converter", IEEE Transactions on Industrial Electronics, Jan. 1, 2012, pp. 154-166, vol. 59, No. 1, XP011478668.

(Continued)

*Primary Examiner* — Harry Behm
*Assistant Examiner* — Bryan R Perez
(74) *Attorney, Agent, or Firm* — Mori & Ward, LLP

(57) ABSTRACT

A matrix converter includes: a power convertor that includes a plurality of bidirectional switches configured to control a conducting direction using a plurality of switching elements; a command generator configured to generate a control command for a PWM control on the plurality of switching elements; and a commutation controller configured to perform a commutation control on the plurality of bidirectional switches in a case where the control command changes. In a case where the control command changes during execution of the commutation control, the commutation controller executes a handover step for handover to a next commutation control and then executes the next commutation control from a step in a course of the next commutation control.

16 Claims, 18 Drawing Sheets

(58) Field of Classification Search
CPC .... H02M 5/2576; H02M 7/162; H02M 7/219; H02M 7/521; H02M 7/5387; H02J 3/1892
See application file for complete search history.

(56) References Cited

OTHER PUBLICATIONS

Clare et al., "Enhancement of Matrix Converter Output Waveform Quality Using Minimized Communication Times", IEEE Transactions on Industrial Electronics, Feb. 1, 2004, pp. 240-244, vol. 51, No. 1, XP011107010.
Extended European Search Report for corresponding EP Application No. 14188242.3-1809, Nov. 18, 2015.
Japsneee Office Action for corresponding JP Application No. 2013-214746, Jul. 14, 2015.

* cited by examiner

US 9,660,545 B2

MATRIX CONVERTER

CROSS-REFERENCE TO RELATED APPLICATION

The present application claims priority under 35 U.S.C. §119 to Japanese Patent Application No. 2013-214746, filed Oct. 15, 2013. The contents of this application are incorporated herein by reference in their entirety.

BACKGROUND

1. Technical Field

The embodiment of the disclosure relates to a matrix converter.

2. Related Art

A matrix converter includes a plurality of bidirectional switches that couple respective phases of an AC power supply and respective phases of a load together. Directly switching respective phase voltages of the AC power supply by controlling these bidirectional switches causes the output of an AC power with any voltage and frequency to the load.

In this matrix converter, the bidirectional switch switches the phase of the AC power supply to be coupled to the load. During this switching, a commutation control that individually turns on/off a plurality of respective switching elements constituting the bidirectional switch in a predetermined order is performed. This suppresses a short circuit between phases for the input phase, circuit opening of the output phase, and similar trouble.

As a method of this commutation control, for example, a current commutation method is known. The current commutation method is a commutation method that controls the switching elements with an on-off pattern in accordance with the polarity of the output electric current to the load. In this current commutation method, in the case where the phase of the AC power supply to be coupled to the load is continuously switched in a short time, the next commutation control might be started in the course of the commutation control. Accordingly, commutation failure such as circuit opening of the output phase might occur. This commutation failure might cause deterioration in precision of the output voltage due to a surge voltage or similar cause.

Therefore, a commutation method that continuously switches the phase of the AC power supply to be coupled to the load in a short time while reducing the commutation failure has been proposed (for example, see JP-A-2004-364477). The switching elements constituting the bidirectional switch include a switching element that is coupled between the phase at the maximum voltage and the phase at the intermediate voltage in the AC power supply and operates in a reflux diode mode. In the commutation method in the above-described publication, this switching element remains to be turned on until the commutation control is completed.

SUMMARY

A matrix converter includes: a power convertor that includes: a plurality of input terminals to be coupled to respective phases of an AC power supply; a plurality of output terminals to be coupled to respective phases of a load; and a plurality of bidirectional switches disposed between the input terminals and the output terminals, the bidirectional switch being configured to control a conducting direction using a plurality of switching elements; a command generator configured to generate a control command for a PWM control on the plurality of switching elements; and a commutation controller configured to perform a commutation control on the plurality of bidirectional switches by controlling the plurality of switching elements with a commutation pattern having a plurality of steps in a case where the control command changes. In a case where the control command changes during execution of the commutation control, the commutation controller executes a handover step for handover to a next commutation control and then executes the next commutation control from a step in a course of the next commutation control.

DETAILED DESCRIPTION

Figure 1:
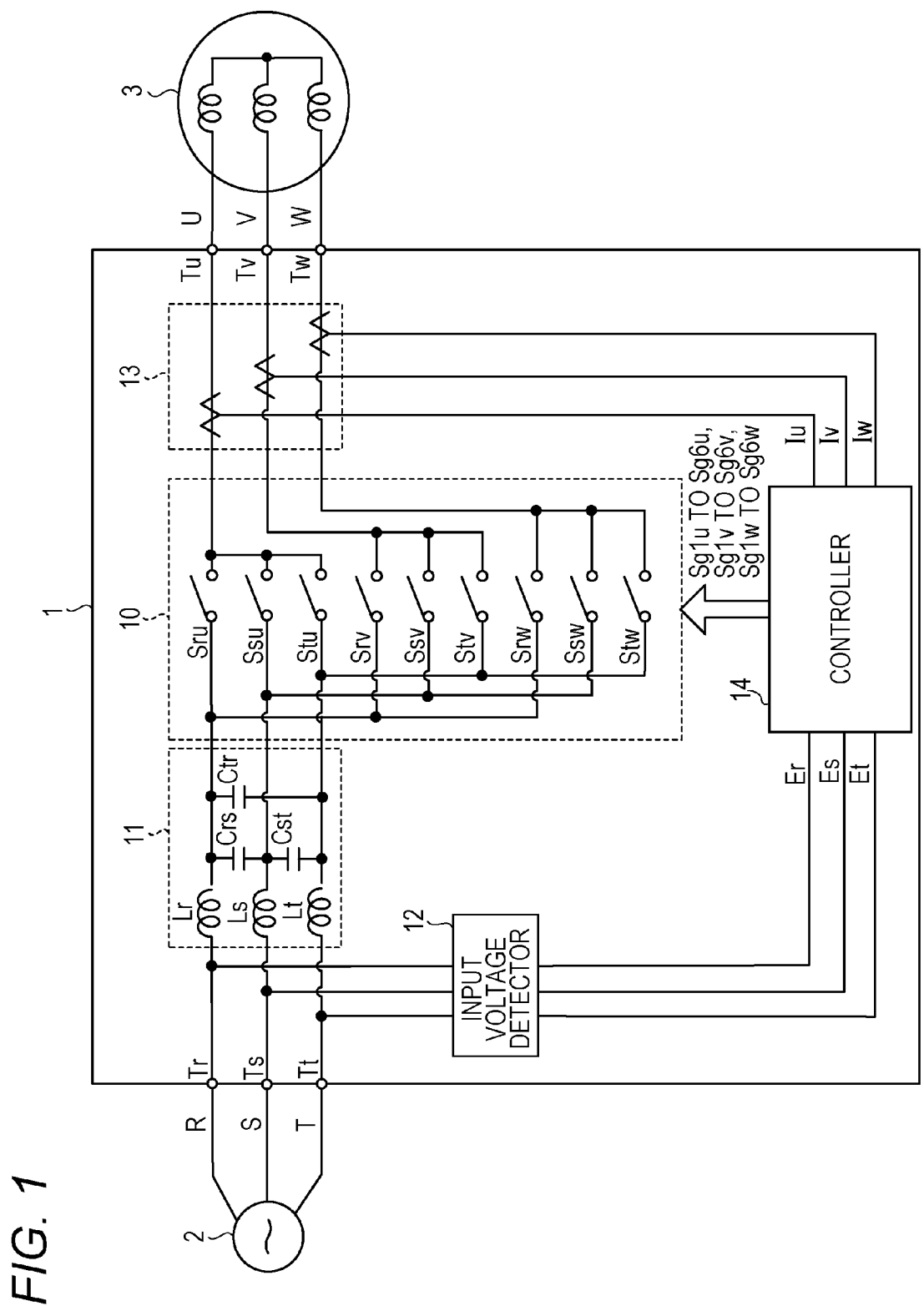
FIG. 1 is a diagram illustrating an exemplary configuration of a matrix converter according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A matrix converter according to one aspect of the embodiment includes a power converter, a command generator, and a commutation controller. The power converter includes a plurality of bidirectional switches configured to control a conducting direction using a plurality of switching elements. These bidirectional switches are disposed between: a plurality of input terminals to be coupled to respective phases of an AC power supply; and a plurality of output terminals to be coupled to respective phases of a load. The command generator is configured to generate a control command for a PWM control on the plurality of switching elements. The commutation controller is configured to perform a commutation control by controlling the plurality of switching elements with a commutation pattern having a plurality of steps in the case where the control command changes. In the case where the control command changes during execution of the commutation control, the commutation controller executes a handover step for handover to the next commutation control and then executes the next commutation control from a step in the course of the next commutation control.

One aspect of the embodiment allows providing a matrix converter that can perform switching of the commutation control while reducing deterioration in precision of the output voltage due to commutation failure even after the commutation control is started.

The following describes the embodiments of a matrix converter disclosed in this application in detail with reference to the accompanying drawings. Here, the following embodiments do not limit the content of this disclosure.

1. First Embodiment (1.1. Configuration of Matrix Converter)

FIG. 1 is a diagram illustrating an exemplary configuration of the matrix converter according to a first embodiment. As illustrated in FIG. 1, a matrix converter 1 according to the first embodiment is disposed between a three-phase AC power supply 2 (hereinafter referred to simply as the AC power supply 2) and a load 3. The load 3 is, for example, an AC electric motor or generator. In the following description, an R-phase, an S-phase, and a T-phase of the AC power supply 2 are described as input phases while a U-phase, a V-phase, and a W-phase of the load 3 are described as output phases.

The matrix converter 1 includes input terminals Tr, Ts and Tt, output terminal Tu, Tv and Tw, a power converter 10, an LC filter 11, an input voltage detector 12, an output electric current detector 13, and a controller 14. The matrix converter 1 converts a three-phase power to be supplied from the AC power supply 2 through the input terminals Tr, Ts and Tt into a three-phase power with any voltage and frequency, and outputs this power to the load 3 from the output terminals Tu, Tv and Tw.

The power converter 10 includes a plurality of bidirectional switches Sru, Ssu, Stu, Srv, Ssv, Sty, Srw, Ssw, and Stw (hereinafter referred to collectively as a bidirectional switch S in some cases) that couple the phases of the AC power supply 2 to the respective phases of the load 3.

The bidirectional switches Sru, Ssu, and Stu couple the respective R-phase, S-phase, and T-phase of the AC power supply 2 to the U-phase of the load 3. The bidirectional switches Srv, Ssv, and Sty couple the respective R-phase, S-phase, and T-phase of the AC power supply 2 to the V-phase of the load 3. The bidirectional switches Srw, Ssw, and Stw couple the respective R-phase, S-phase and T-phase of the AC power supply 2 to the W-phase of the load 3.

Figure 2:
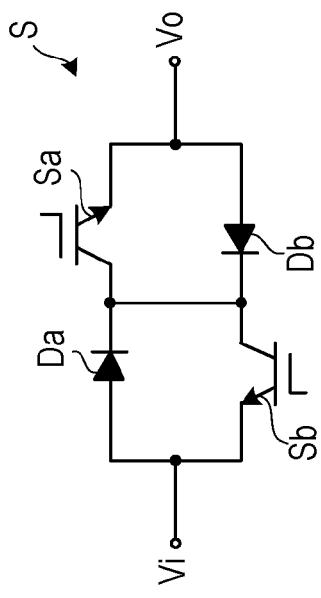
FIG. 2 is a diagram illustrating an exemplary configuration of a bidirectional switch illustrated in FIG. 1.

FIG. 2 is a diagram illustrating an exemplary configuration of the bidirectional switch S. As illustrated in FIG. 2, the bidirectional switch S includes a series-coupled circuit formed by a switching element Sa and a diode Da and a series-coupled circuit formed by a switching element Sb and a diode Db. These series-coupled circuits are coupled in inverse-parallel to each other. In FIG. 2, an input phase voltage is denoted by Vi and an output phase voltage is denoted by Vo.

Here, the bidirectional switch S only needs to include a plurality of switching elements and to be configured to control the conducting direction, and is not limited to the configuration illustrated in FIG. 2. For example, in the example illustrated in FIG. 2, respective cathodes of the diodes Da and Db are coupled to each other. However, the bidirectional switch S may have a configuration where the respective cathodes of the diodes Da and Db are not coupled to each other.

The switching elements Sa and Sb are semiconductor switching elements such as a metal-oxide-semiconductor field-effect transistor (MOSFET) and an insulated gate bipolar transistor (IGBT). The switching elements Sa and Sb may employ SiC or GaN that is a next-generation semiconductor switching element.

Returning to FIG. 1, the description of the matrix converter 1 will be continued. The LC filter 11 is disposed between: the R-phase, the S-phase, and the T-phase of the AC power supply 2; and the power converter 10. This LC filter 11 includes three reactors Lr, Ls, and Lt and three capacitors Crs, Cst, and Ctr. This LC filter 11 removes a high-frequency component caused by switching of the bidirectional switch S.

The input voltage detector 12 detects the voltages of the R-phase, the S-phase, and the T-phase of the AC power supply 2. Specifically, the input voltage detector 12 detects respective instantaneous values Er, Es, and Et (hereinafter referred to as input phase voltages Er, Es, and Et) in the voltages of the R-phase, the S-phase and the T-phase of the AC power supply 2.

The output electric current detector 13 detects the electric current flowing between the power converter 10 and the load 3. Specifically, the output electric current detector 13 detects instantaneous values Iu, Iv, and Iw (hereinafter referred to as output-phase electric currents Iu, Iv, and Iw) of electric currents flowing between: the power converter 10; and the respective U-phase, V-phase, and W-phase of the load 3. Here, in the following description, the output-phase electric currents Iu, Iv, and Iw are referred to collectively as an output electric current Io in some cases.

Based on the input phase voltages Er, Es, and Et and the output-phase electric currents Iu, Iv, and Iw, the controller 14 generates drive signals Sg1u to Sg6u, Sg1v to Sg6v, and Sg1w to Sg6w. Here, in the following description, the drive signals Sg1u to Sg6u, Sg1v to Sg6v, and Sg1w to Sg6w are referred to collectively as a drive signal Sg in some cases. The following specifically describes the controller 14.

(1.2. Configuration of Controller 14)

Figure 3:
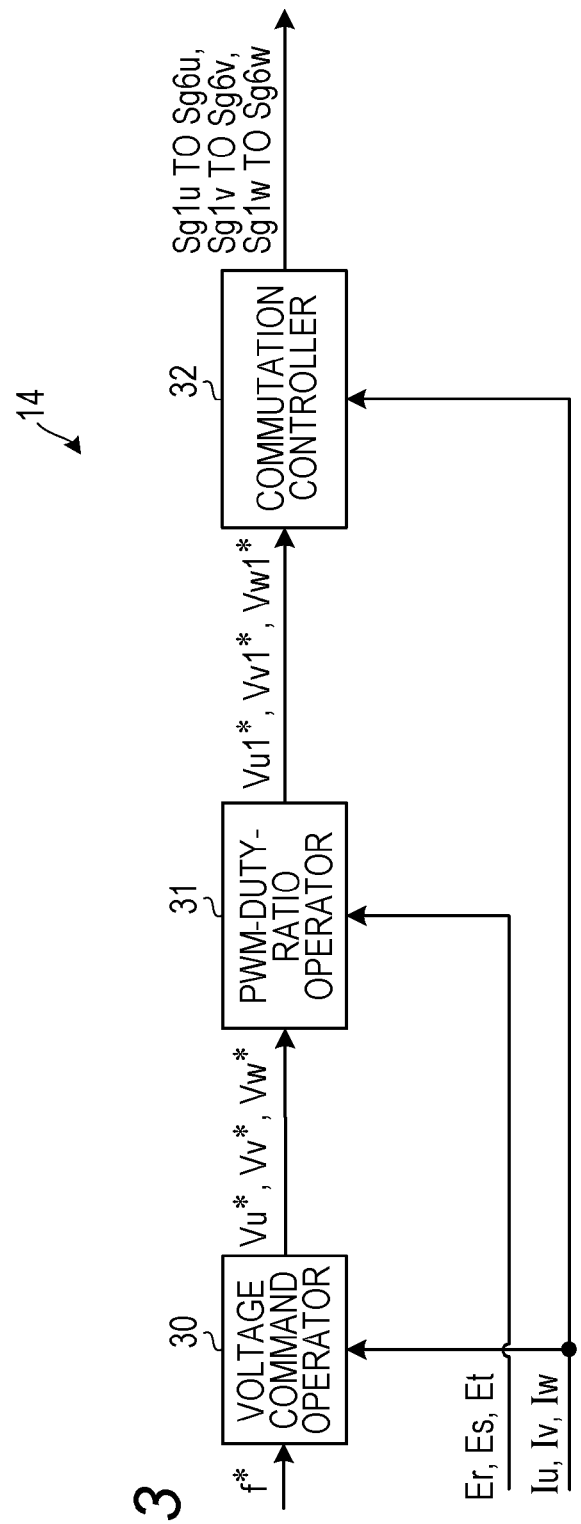
FIG. 3 is a diagram illustrating an exemplary configuration of a controller illustrated in FIG. 1.

FIG. 3 is a diagram illustrating an exemplary configuration of the controller 14. As illustrated in FIG. 3, the controller 14 includes a voltage command operator 30, a PWM-duty-ratio operator 31 (an exemplary command generator), and a commutation controller 32.

This controller 14 includes, for example, a microcomputer that includes a central processing unit (CPU), a read only memory (ROM), a random access memory (RAM), input/output ports, and similar member and various circuits. The CPU of this microcomputer reads out the program stored in the ROM and executes this program so as to function as the voltage command operator 30, the PWM-duty-ratio operator 31, and the commutation controller 32. Here, the controller 14 may be configured by hardware without using the program.

(1.3. Voltage Command Operator 30)

The voltage command operator 30 generates and outputs voltage commands Vu*, Vv*, and Vw* (hereinafter referred to collectively as a voltage command Vo* in some cases) of the respective output phases based on a frequency command f* and the output-phase electric currents Iu, Iv, and Iw. The frequency command f* is a command for frequencies of output phase voltages Vu, Vv, and Vw.

(1.4. PWM-Duty-Ratio Operator 31)

The PWM-duty-ratio operator 31 generates PWM voltage commands Vu1*, Vv1*, and Vw1* (an exemplary control command) based on the voltage commands Vu*, Vv*, and Vw* and the input phase voltages Er, Es, and Et. The technique for generating the PWM voltage commands Vu1*, Vv1*, and Vw1* is a publicly-known technique. For generation of the PWM voltage commands Vu1*, Vv1*, and Vw1*, for example, a technique disclosed in JP-A-2008-048550 or JP-A-2012-239265 is used.

For example, the PWM-duty-ratio operator 31 sets the input phase voltages Er, Es, and Et to input phase voltage Ep, Em, and En (Ep>Em>En) in descending order in a period where the magnitude relationship between the input phase voltages Er, Es, and Et does not change. The PWM-duty-ratio operator 31 converts the voltage commands Vu*, Vv*, and Vw* into pulse width modulation signals corresponding to the respective voltage values of the input phase voltages Ep, Em, and En and outputs the respective signals as the PWM voltage commands Vu1*, Vv1*, and Vw1*. Here, in the following description, the PWM voltage command Vu1*, Vv1*, and Vw1* are referred to collectively as a PWM voltage command Vo1* in some cases.

(1.5. Commutation Controller 32)

The commutation controller 32 executes a commutation control that switches the phases of the AC power supply 2 to be coupled the load 3 with the bidirectional switch S. Specifically, in the case where the PWM voltage command Vo1* changes, the commutation controller 32 determines the switching order of the switching elements Sa and Sb that constitute the bidirectional switch S during commutation based on the polarity of the output electric current Io. The commutation controller 32 generates the drive signal Sg based on the determined switching order.

The drive signal Sg is input to the switching elements Sa and Sb of the plurality of bidirectional switches S that constitutes the power converter 10. Accordingly, turning on/off of the switching elements Sa and Sb that constitute the respective bidirectional switches S is controlled.

Specifically, the switching elements Sa (see FIG. 2) of the bidirectional switches Sru, Ssu, Stu, Srv, Ssv, Sty, Srw, Ssw, and Stw (see FIG. 1) are controlled by the respective drive signals Sg1u to Sg3u, Sg1v to Sg3v, and Sg1w to Sg3w. The switching elements Sb (see FIG. 2) of the bidirectional switches Sru, Ssu, Stu, Srv, Ssv, Sty, Srw, Ssw, and Stw (see FIG. 1) are controlled by the respective drive signals Sg4u to Sg6u, Sg4v to Sg6v, and Sg4w to Sg6w.

Figure 4:
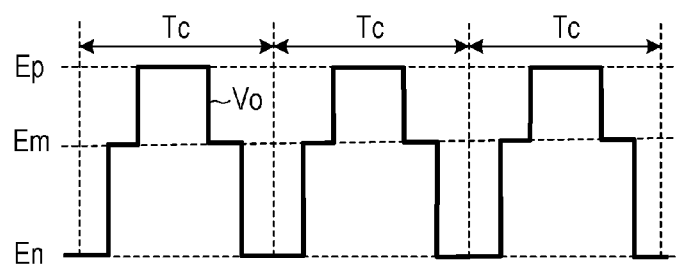
FIG. 4 is a diagram illustrating switching of input phase voltages to be output to respective output phases.

FIG. 4 is a diagram illustrating switching of the input phase voltages Ep, Em, and En to be output to the respective output phases. In FIG. 4, the output phase voltage is denoted by Vo. As illustrated in FIG. 4, the control of the bidirectional switch S with the drive signal Sg causes switching of the input phase voltage to be output to the output phase from En to Em to Ep to Em to En in one cycle Tc of the PWM voltage command Vo1* that is the pulse width modulation signal. Here, the switching of the input phase voltage to be output to the output phase is not limited to En to Em to Ep to Em to En as described later.

The commutation controller 32 performs a commutation control using a current commutation method when the input phase voltage to be output to the output phase is switched. Here, as one example of the current commutation method executed by the commutation controller 32, a four-step current commutation method will be described.

In the four-step current commutation method, to suppress a short circuit between the input phases and circuit opening of the output phase, a commutation control is performed with a commutation pattern that includes the following first to fourth steps corresponding to the polarity of the output electric current Io.

First Step: A switching element that has a conducting direction of the reversed polarity to the polarity of the output electric current Io among the switching elements that constitute the bidirectional switch S (the bidirectional switch S in a coupling condition before the switching) of a switching source is turned off.

Second Step: A switching element that has a conducting direction of the same polarity as the polarity of the output electric current Io among the switching elements that constitute the bidirectional switch S (the bidirectional switch S set to be in a coupling condition by the switching) of a switching destination is turned on.

Third Step: A switching element that has a conducting direction of the same polarity as the polarity of the output electric current among the switching elements that constitute the bidirectional switch S of a switching source is turned off.

Fourth Step: A switching element that has a conducting direction of the reversed polarity to the polarity of the output electric current Io among the switching elements that constitute the bidirectional switch S of a switching destination is turned on.

Figure 5:
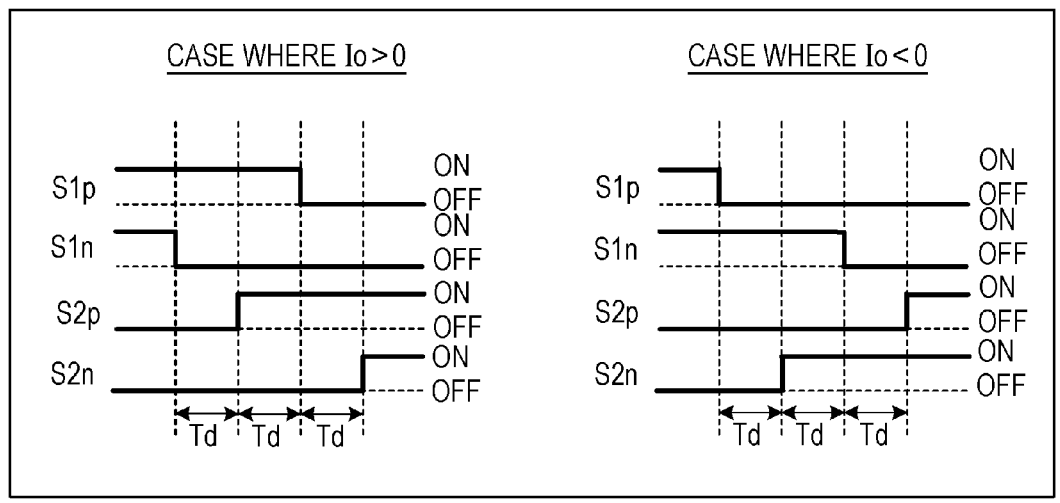
FIG. 5 is a diagram illustrating transitions of on/off of switching elements with a commutation pattern of a current commutation method.

FIG. 5 is a diagram illustrating transitions of on/off of the switching elements with a commutation pattern of the four-step current commutation method for each of the cases where Io>0 and Io<0. Switching elements S1p and S1n are the respective switching elements Sa and Sb of the bidirectional switch S of a switching source. Switching elements S2p and S2n are the respective switching elements Sa and Sb of the bidirectional switch S of a switching destination.

Figure 6:
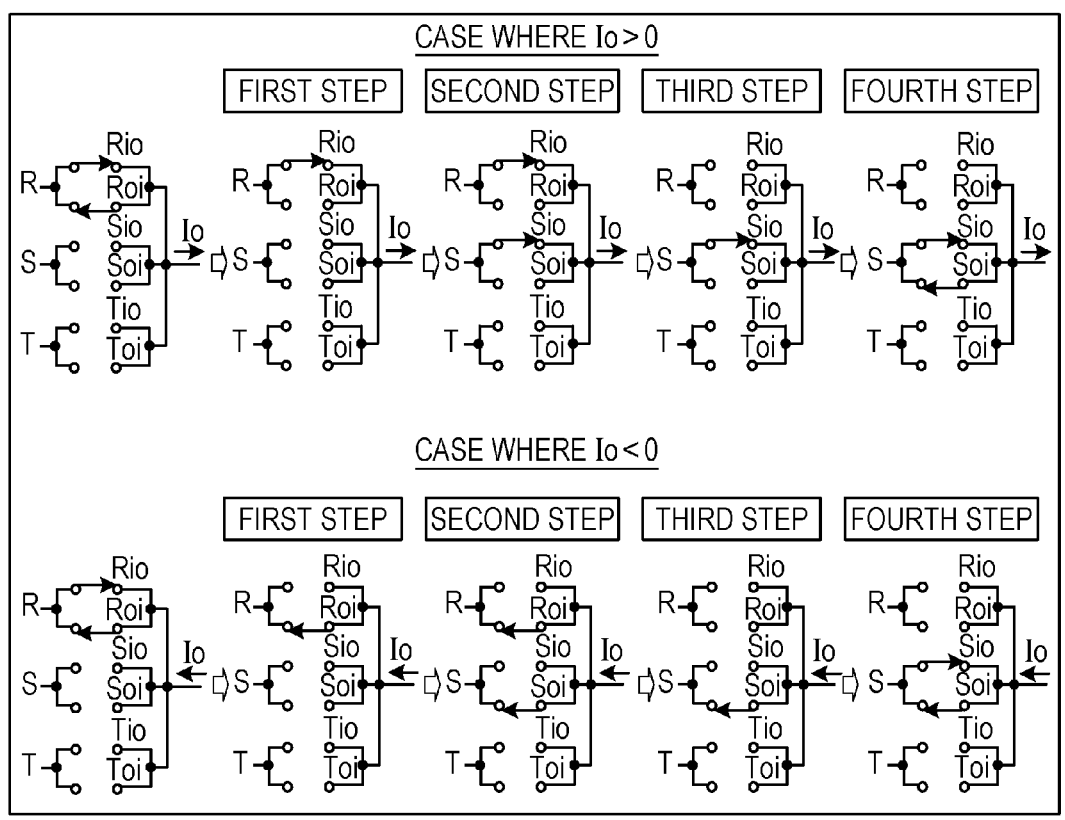
FIG. 6 is a diagram illustrating state transitions of the switching elements in the case where the input phase voltage to be output to the output phase is switched by a PWM voltage command.

FIG. 6 is a diagram illustrating state transitions of the switching elements in the case where the input phase voltage to be output to the output phase is switched from Er to Es based on the PWM voltage command Vo1* for each of the cases where Io>0 and Io<0. In FIG. 6, the respective switching elements Sa and Sb coupled to the R-phase are denoted by Rio and Roi. Additionally, the respective switching elements Sa and Sb coupled to the S-phase are denoted by Sio and Soi. Furthermore, the respective switching elements Sa and Sb coupled to the T-phase are denoted by Tio and Toi.

The commutation controller 32 might receive an instruction of the next commutation control using the PWM voltage command Vo1* during execution of this commutation control with the current commutation method. In the case where the next commutation control is performed in the course of the commutation control, the commutation controller 32 executes, for example, a handover step that turns on one uni-directional switch that constitutes the bidirectional switch S to be a switching destination of the next commutation control. This allows suppressing the commutation failure such as circuit opening of the output phase. As a result, the transitions between the commutation controls can be accurately performed. The following specifically describes the commutation controller 32.

Figure 7:
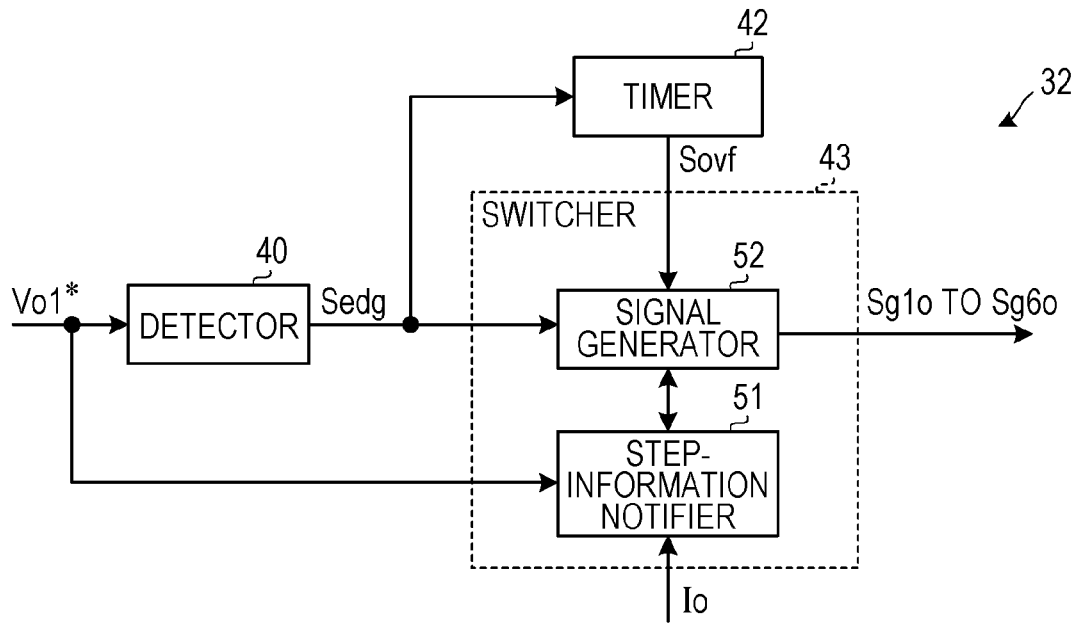
FIG. 7 is a diagram illustrating an exemplary configuration of a commutation controller illustrated in FIG. 3.

FIG. 7 is a diagram illustrating an exemplary configuration of the commutation controller 32. As illustrated in FIG. 7, the commutation controller 32 includes a detector 40, a timer 42, and a switcher 43. Here, the configuration of the commutation controller 32 is not limited to the example illustrated in FIG. 7.

The detector 40 detects a change of the PWM voltage command Vo1*. The PWM voltage command Vo1* is a command for specifying the input phase voltage to be output to the output phase from the input phase voltages Er, Es, and Et. The detector 40 gives notice of edge detection information Sedg to the timer 42 and the switcher 43 at the timing when the input phase voltage specified by the PWM voltage command Vo1* is changed.

When the edge detection information Sedg is notified, the timer 42 starts timing. The timer 42 gives notice of overflow information Sovf to the switcher 43 every lapse of a step time Td (see FIG. 5). The timer 42 stops timing after repeating a predetermined number of timings of the step time Td. The step time Td is, for example, a time longer than the turn-on time and the turn-off time of the switching elements Sa and Sb.

The switcher 43 includes a step-information notifier 51 and a signal generator 52. This switcher 43 generates and outputs drive signals Sg1o to Sg6o based on the PWM voltage command Vo1*, the polarity of the output electric current Io, the edge detection information Sedg, and the overflow information Sovf. The drive signals Sg1o to Sg6o are the drive signal Sg1u to Sg6u for the PWM voltage command Vu1*, the drive signals Sg1v to Sg6v for the PWM voltage command Vv1*, and the drive signals Sg1w to Sg6w for the PWM voltage command Vw1*.

The step-information notifier 51 provides step information to the signal generator 52 based on the PWM voltage command Vo1* and the polarity of the output electric current Io. The step information includes information of the first to fourth steps and information of the handover step.

Figure 8:
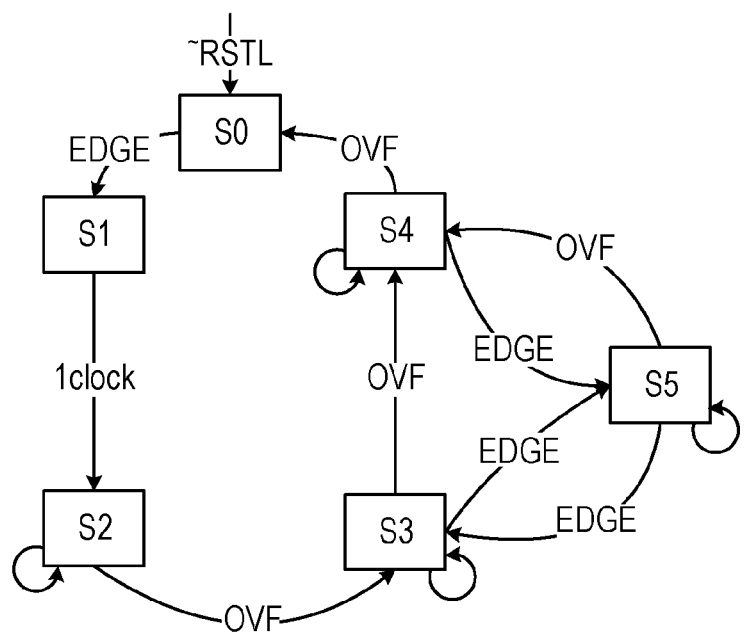
FIG. 8 is a diagram illustrating state transitions of a signal generator illustrated in FIG. 7.

The signal generator 52 makes the transition of its own state among the state S0 to the state S5 based on the edge detection information Sedg and the overflow information Sovf. FIG. 8 is a diagram illustrating the state transitions of the signal generator 52. Here, in FIG. 8, the notification of the overflow information Sovf is denoted by OVF and the notification of the edge detection information Sedg is denoted by EDGE.

As illustrated in FIG. 8, the signal generator 52 transitions to a state S1 when the edge detection information Sedg is notified in a state S0. Accordingly, the commutation control is started. The state S0 denotes a standby state where the commutation control is not performed. Subsequently, the signal generator 52 transitions to a state S2 with the next one clock. After the transition to the state S2, the signal generator 52 acquires the information of the first step from the step-information notifier 51. Furthermore, the signal generator 52 changes the states of the drive signals Sg1o to Sg6o based on the information of the first step.

Subsequently, the signal generator 52 sequentially transitions from the state S2 to a state S3, from the state S3 to a state S4, and from the state S4 to the state S0 every time the overflow information Sovf is notified. Every transition of the state, the signal generator 52 sequentially acquires the information of the second step, the information of the third step, and the information of the fourth step from the step-information notifier 51. Furthermore, the signal generator 52 sequentially changes the states of the drive signals Sg1o to Sg6o based on the acquired information. Accordingly, the input phase voltage to be output to the output phase is switched and then the commutation control terminates. Here, the signal generator 52 can also transition directly from the state S0 to the state S2.

On the other hand, the signal generator 52 transitions to the state S5 when the edge detection information Sedg is notified in the state S3 or S4. After the transition to the state S5, the signal generator 52 acquires the information of the handover step from the step-information notifier 51. Furthermore, the signal generator 52 changes the states of the drive signals Sg1o to Sg6o based on this information of the handover step. Here, the signal generator 52 does not make the transition of the state even in the case where the edge detection information Sedg is notified in the state S2.

The signal generator 52 transitions from the state S5 to the state S4 when the overflow information Sovf is notified in the state S5. After the transitions to the state S4, the signal generator 52 acquires the information of the third step from the step-information notifier 51. Furthermore, the signal generator 52 changes the states of the drive signals Sg1o to Sg6o based on the information of the third step.

The signal generator 52 transitions to the state S3 when the edge detection information Sedg is notified in the state S5. After the transition to the state S3, the signal generator 52 acquires the information of the second step from the step-information notifier 51. Furthermore, the signal generator 52 changes the states of the drive signals Sg1o to Sg6o based on the information of the second step.

Here, with reference to FIG. 9 to FIG. 11, a description will be given of the transitions among the commutation controls in the case where the edge detection information Sedg is notified in each of the states S2, S3, and S4. In a state where Io>0, the input phase voltage to be output to the output phase by the PWM voltage command Vo1* is assumed to change from Er to Es and further change from Es to Et.

Figure 9:
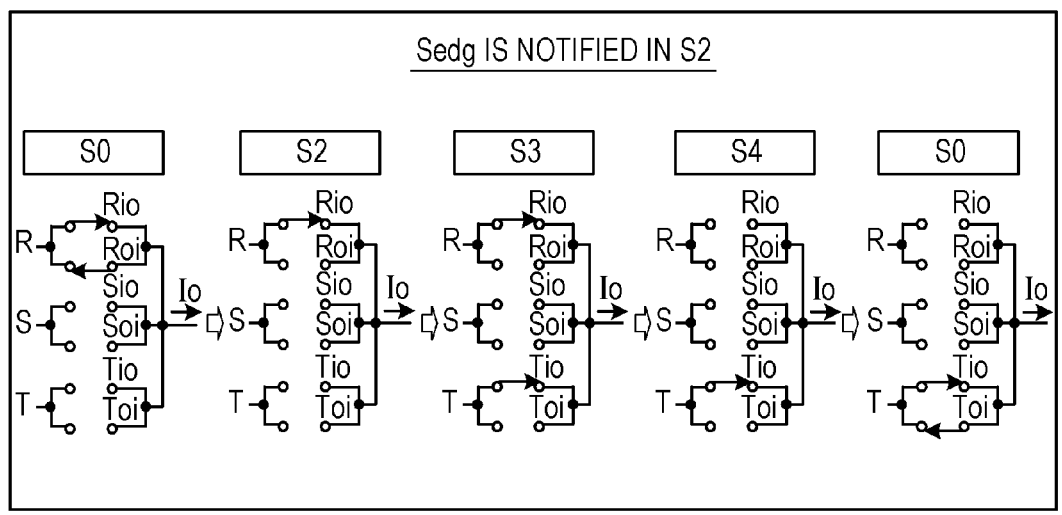
FIG. 9 is a diagram illustrating state transitions of the bidirectional switches in the case where edge detection information is notified in a state S2.

FIG. 9 is a diagram illustrating the state transitions of the bidirectional switch S in the case where the edge detection information Sedg is notified in the state S2. As illustrated in FIG. 9, even when the edge detection information Sedg is notified in the state S2, the signal generator 52 does not make the transition of the state and waits for the notification of the overflow information Sovf. The signal generator 52 transitions to the state S3 when the overflow information Sovf is notified.

After the transition to the state S3, the signal generator 52 acquires the information of the second step of the next commutation control from the step-information notifier 51 and turns on the switching element Toi based on the acquired information. In the state S3, since the switching element Rio is maintained to be turned on, circuit opening of the output phase does not occur. Thus, in the case where the edge detection information Sedg is notified in the state S2, the signal generator 52 makes the transition between the commutation controls without the control of the handover step.

Figure 10:
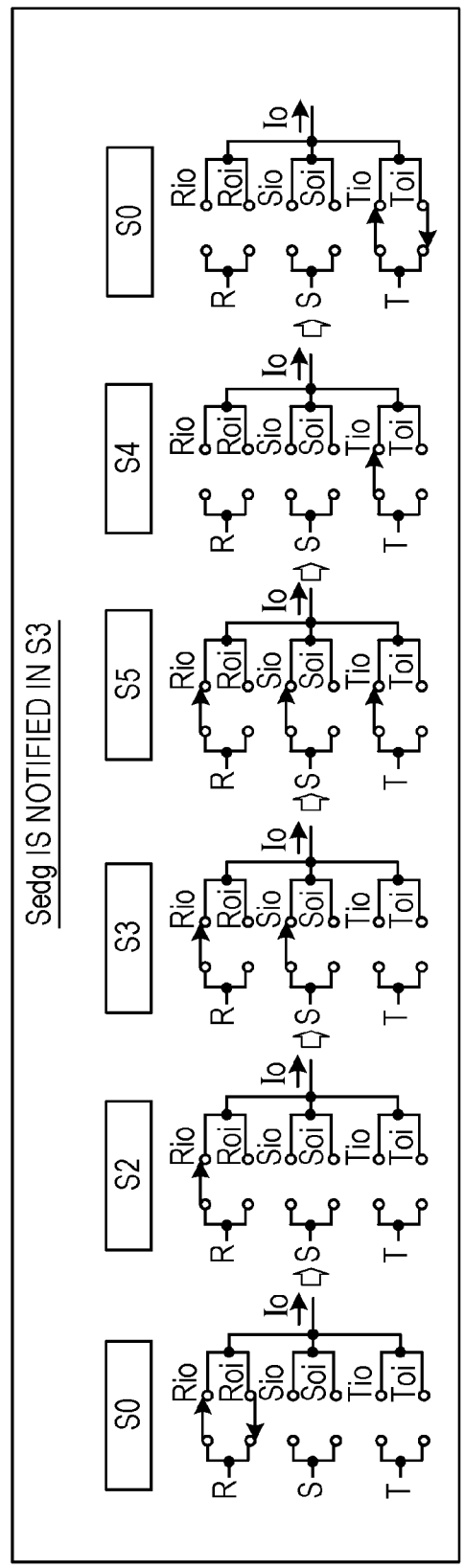
FIG. 10 is a diagram illustrating state transitions of the bidirectional switches in the case where the edge detection information is notified in a state S3.

FIG. 10 is a diagram illustrating the state transitions of the bidirectional switch S in the case where the edge detection information Sedg is notified in the state S3. As illustrated in FIG. 10, when the edge detection information Sedg is notified in the state S3, the signal generator 52 transitions to the state S5 and turns on the switching element Tio.

Subsequently, when the overflow information Sovf is notified, the signal generator 52 transitions to the state S4 and turns off the switching elements Rio and Sio. Even when the switching elements Rio and Sio are turned off, the switching element Tio that has the conducting direction of the same polarity as the polarity of the output electric current Io keeps turned on. Accordingly, circuit opening of the output phase does not occur. This reduces deterioration in precision of the output voltage due to the surge voltage.

On the other hand, for the transition from the state S3 to the state S4 without the handover step, the output phase becomes open when the turn-off times of the switching elements Rio and Sio are shorter than the turn-on time of the switching element Tio. As a result, deterioration in precision of the output voltage occurs due to the surge voltage.

Figure 11:
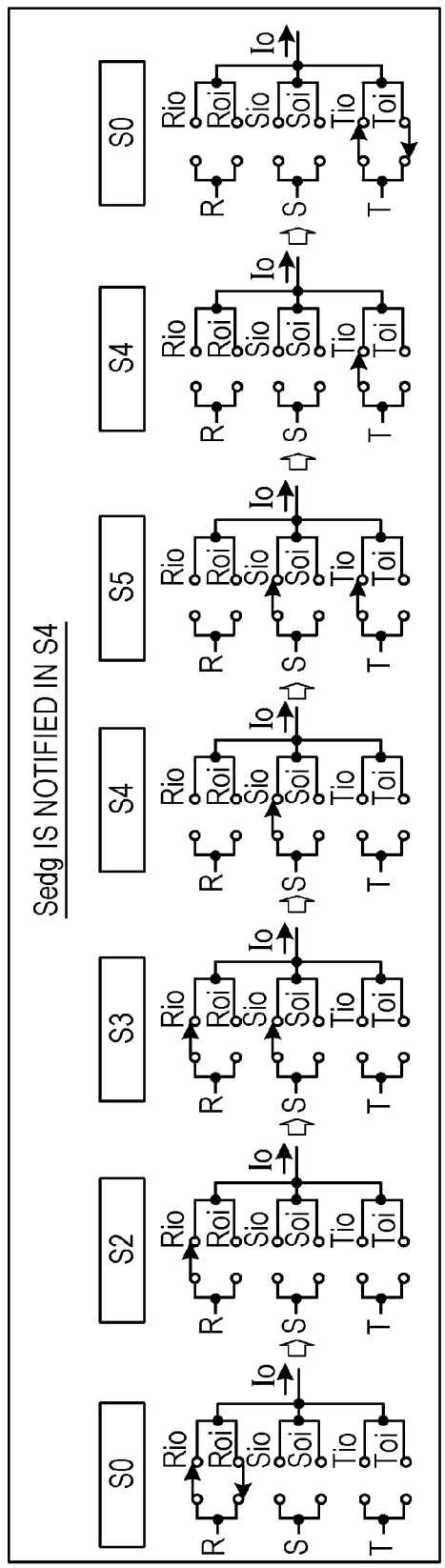
FIG. 11 is a diagram illustrating state transitions of the bidirectional switches in the case where the edge detection information is notified in a state S4.

FIG. 11 is a diagram illustrating the state transitions of the bidirectional switch S in the case where the edge detection information Sedg is notified in the state S4. As illustrated in FIG. 11, when the edge detection information Sedg is notified in the state S4, the signal generator 52 transitions to the state S5 and turns on the switching element Tio.

Subsequently, when the overflow information Sovf is notified, similarly to the case illustrated in FIG. 10, the signal generator 52 transitions to the state S4 and turns off the switching element Sio. Even when the switching element Sio is turned off, the switching element Tio that has the conducting direction of the same polarity as the polarity of the output electric current Io keeps turned on. Thus, deterioration in precision of the output voltage occurs due to the surge voltage.

On the other hand, for the transition from the state S4 to the state S0 without the handover step, the output phase becomes open when the turn-off time of the switching element Sio is shorter than the turn-on time of the switching element Tio. As a result, deterioration in precision of the output voltage occurs due to the surge voltage.

As described above, in the case where the PWM voltage command Vo1* changes during execution of the commutation control, the commutation controller 32 of the matrix converter 1 executes the handover step that turns on one switching element that constitutes the bidirectional switch S to be the switching destination in the next commutation control. Subsequently, the commutation controller 32 executes the next commutation control from the step in the course of the control. Accordingly, the matrix converter 1 can perform switching of the commutation control while reducing deterioration in precision of the output voltage due to commutation failure even after the commutation control is started.

In the case where the PWM voltage command Vo 1* changes when the commutation control is in the first step, the commutation controller 32 executes the next commutation control from the second step of the commutation pattern in the next commutation control without the handover step. This allows quick switching of the commutation control.

2. Second Embodiment

The following describes a matrix converter according to a second embodiment. The matrix converter according to the second embodiment differs from the matrix converter 1 according to the first embodiment that performs the commutation control with the current commutation method in that a commutation control with a voltage commutation method is performed. In the following description, a commutation controller different from that in the matrix converter 1 according to the first embodiment will be mainly described. Like reference numerals designate elements with corresponding or identical functions of the first embodiment, and therefore such elements will not be further elaborated here.

Figure 12:
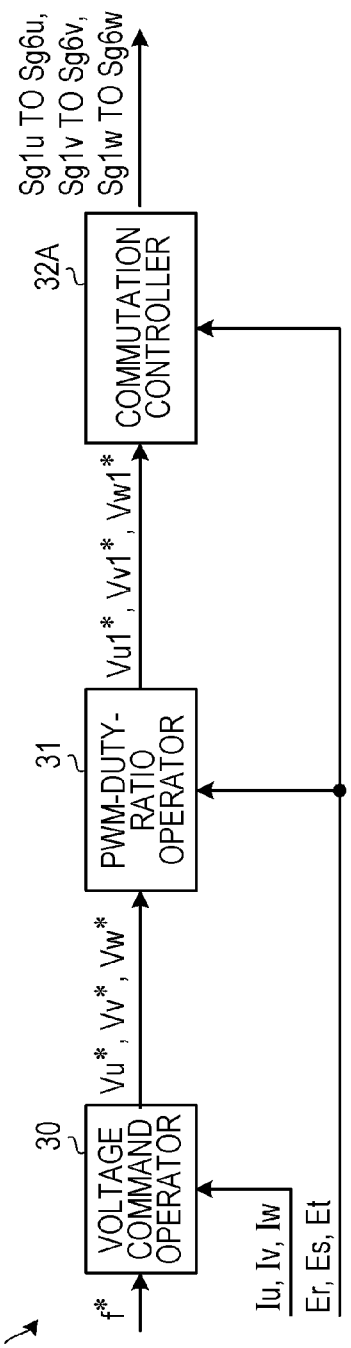
FIG. 12 is a diagram illustrating an exemplary configuration of a commutation controller of a matrix converter according to a second embodiment.

FIG. 12 is a diagram illustrating a configuration of a controller of the matrix converter according to the second embodiment. A controller 14A of the matrix converter according to the second embodiment includes the voltage command operator 30, the PWM-duty-ratio operator 31, and a commutation controller 32A. The voltage command operator 30 and the PWM-duty-ratio operator 31 are configuration members having functions similar to those of the voltage command operator 30 and the PWM-duty-ratio operator 31 according to the first embodiment.

The commutation controller 32A performs the commutation control with the voltage commutation method. Here, as one example of the voltage commutation method executed by the commutation controller 32A, a four-step voltage commutation method will be described.

In the four-step voltage commutation method, to suppress a short circuit between the input phases and circuit opening of the output phase, a commutation control is performed with a commutation pattern that includes the following first to fourth steps corresponding to the magnitude relationship between the input phase voltages Er, Es, and Et. This four-step voltage commutation method does not depend on the polarity of the output electric current Io.

First Step: A switching element to be inversely biased in the bidirectional switch S of the switching destination is turned on.

Second Step: A switching element to be inversely biased in the bidirectional switch S of the switching source is turned off.

Third Step: A switching element to be forward biased in the bidirectional switch S of the switching destination is turned on.

Fourth Step: A switching element to be forward biased in the bidirectional switch S of the switching source is turned off.

Here, in the switching element Sa, the state where the input-side voltage is lower than the output-side voltage immediately before the commutation control is described as inverse bias. The state where the input-side voltage is higher than the output-side voltage immediately before the commutation control is described as forward bias. In the switching element Sb, the state where the input-side voltage is lower than the output-side voltage immediately before the commutation control is described as forward bias. The state where the input-side voltage is higher than the output-side voltage immediately before the commutation control is described as inverse bias. Here, in the case where the switching elements Sa and Sb are IGBTs, the input-side voltage is a collector voltage and the output-side voltage is an emitter voltage.

Figure 13:
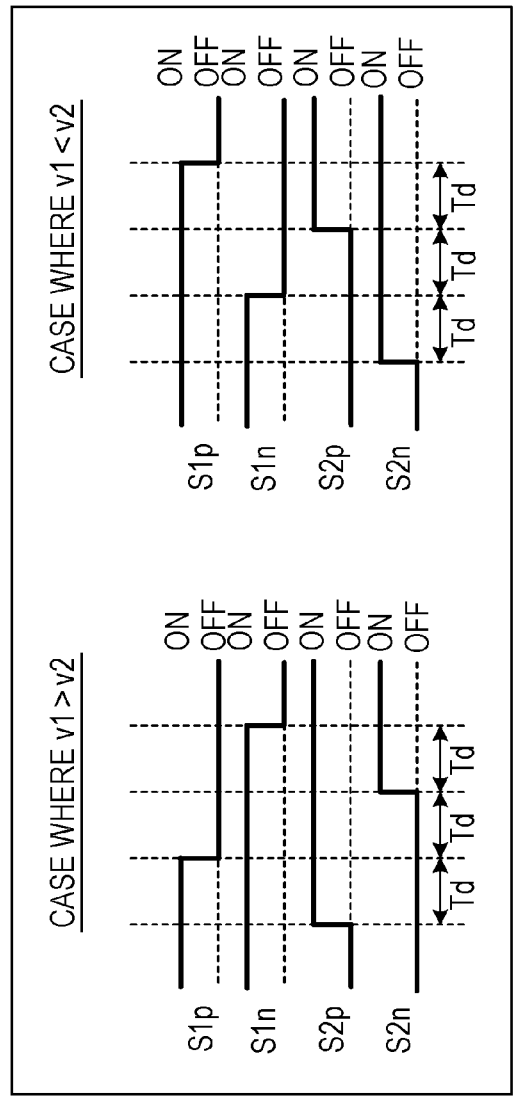
FIG. 13 is a diagram illustrating transitions of on/off of switching elements with a commutation pattern of a voltage commutation method.

FIG. 13 is a diagram illustrating transitions of on/off of the switching elements with a commutation pattern of the four-step voltage commutation method for each of the cases where v1>v2 and v1<v2. Similarly to the first embodiment, the respective switching elements S1p and S1n are the switching elements Sa and Sb of the bidirectional switch S of a switching source. The respective switching elements S2p and S2n are the switching elements Sa and Sb of the bidirectional switch S of a switching destination.

Figure 14:
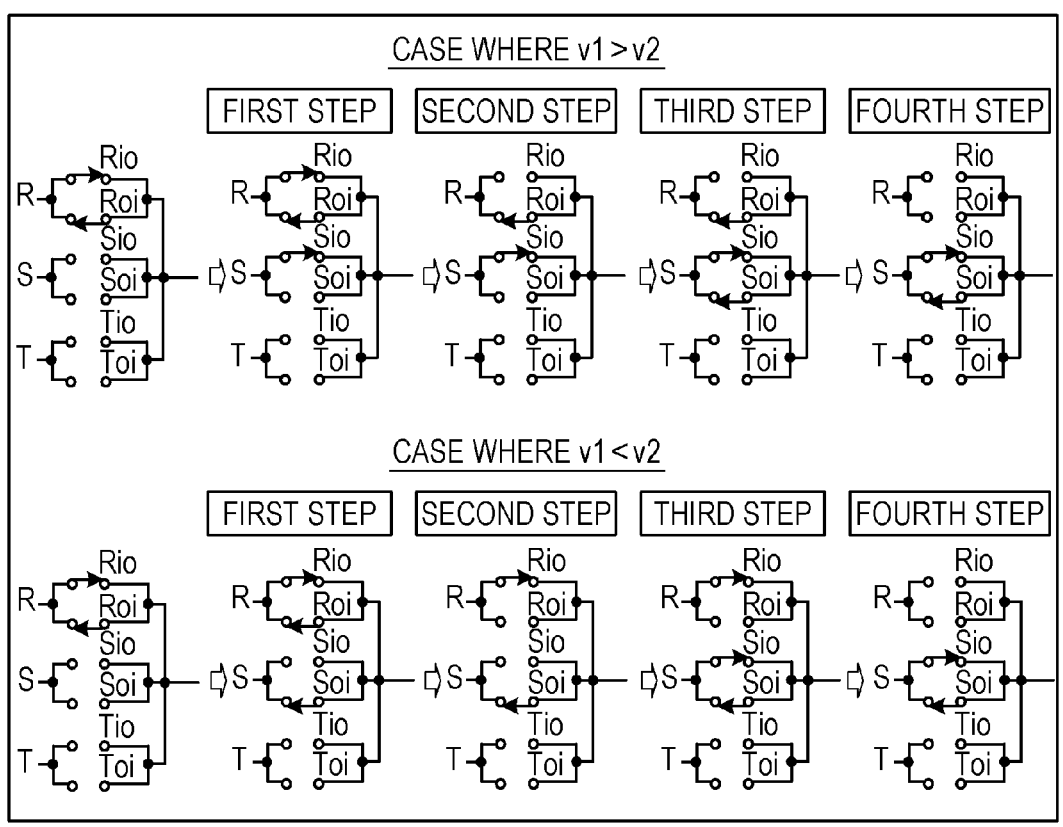
FIG. 14 is a diagram illustrating state transitions of the switching elements in the case where an input phase voltage to be output to an output phase is switched by a PWM voltage command.

FIG. 14 is a diagram illustrating the state transitions of the switching elements in the case where the input phase voltage to be output to the output phase by the PWM voltage command Vo1* is switched from Er to Es for each of the cases where v1>v2 and v1<v2. Here, v1 is the input phase voltage to be output to the output phase before switching, and v2 is the input phase voltage to be output to the output phase after switching. In FIG. 14, similarly to FIG. 6, the respective switching elements Sa and Sb coupled to the R-phase are denoted by Rio and Roi. The respective switching elements Sa and Sb coupled to the S-phase are denoted by Sio and Soi. Furthermore, the respective switching elements Sa and Sb coupled to the T-phase are denoted by Tio and Toi.

Similarly to the commutation controller 32, in the case where the next commutation control is performed in the course of the commutation control, the commutation controller 32A executes, for example, the handover step that turns on one uni-directional switch that constitutes the bidirectional switch S to be a switching destination of the next commutation control. This allows suppressing the commutation failure such as a short circuit of the input phase. As a result, the transitions between the commutation controls can be accurately performed.

Figure 15:
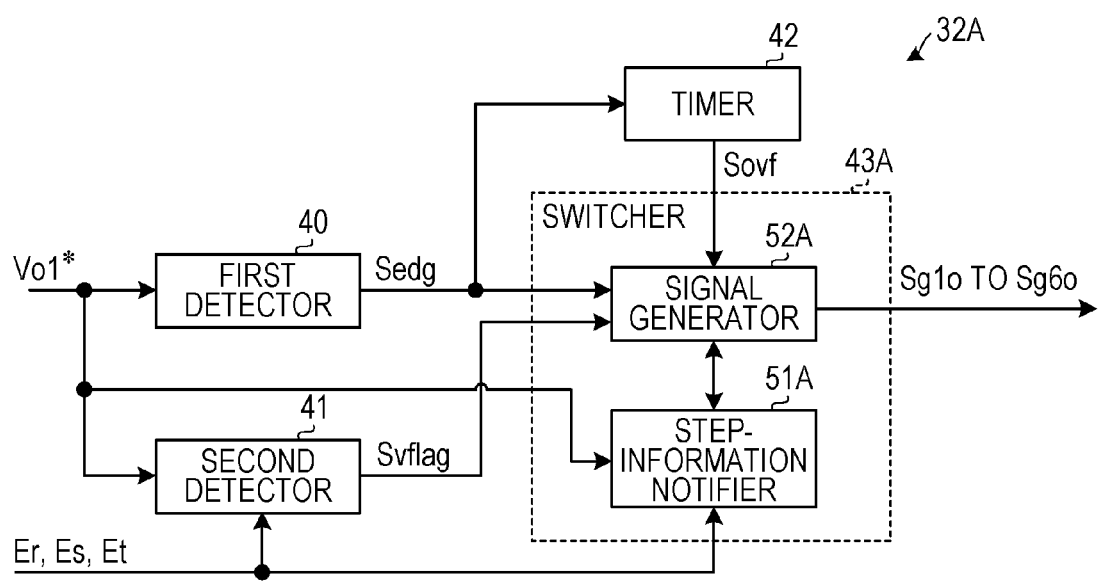
FIG. 15 is a diagram illustrating an exemplary configuration of a commutation controller illustrated in FIG. 12.

FIG. 15 is a diagram illustrating the configuration of the commutation controller 32A. As illustrated in FIG. 15, the commutation controller 32A includes a first detector 40, a second detector 41, the timer 42, and a switcher 43A. The respective first detector 40 and timer 42 illustrated in FIG. 15 are configuration members having functions similar to those of the detector 40 and the timer 42 of the first embodiment. Here, the configuration of the commutation controller 32A is not limited to the example illustrated in FIG. 15.

In the case where the specified voltage of the PWM voltage command Vo1* changes from Ep to En or in the case where the specified voltage of the PWM voltage command Vo1* changes from En to Ep, the second detector 41 gives notice of direction inversion information Svflag to the switcher 43A. For example, in the case where Er>Es>Et, the second detector 41 gives the following notice. That is, the second detector 41 gives notice of the direction inversion information Svflag to the switcher 43A in the case where the specified voltage changes from Er to Et. In the case where the specified voltage changes from Et to Er, the second detector 41 gives notice of the direction inversion information Svflag to the switcher 43A. The direction inversion information Svflag is continuously notified to the switcher 43A until the specified voltage of the PWM voltage command Vo1* changes next time.

The switcher 43A includes a step-information notifier 51A and a signal generator 52A. This switcher 43A generates and outputs the drive signals Sg1o to Sg6o based on the PWM voltage command Vo1*, the magnitude relationship between the input phase voltages Er, Es, and Et, the edge detection information Sedg, the overflow information Sovf, and the direction inversion information Svflag.

The step-information notifier 51A provides step information to the signal generator 52A based on the PWM voltage command Vo1* and the magnitude relationship between the input phase voltages Er, Es, and Et. The step information includes information of the first to fourth steps and information of the handover step.

Figure 16:
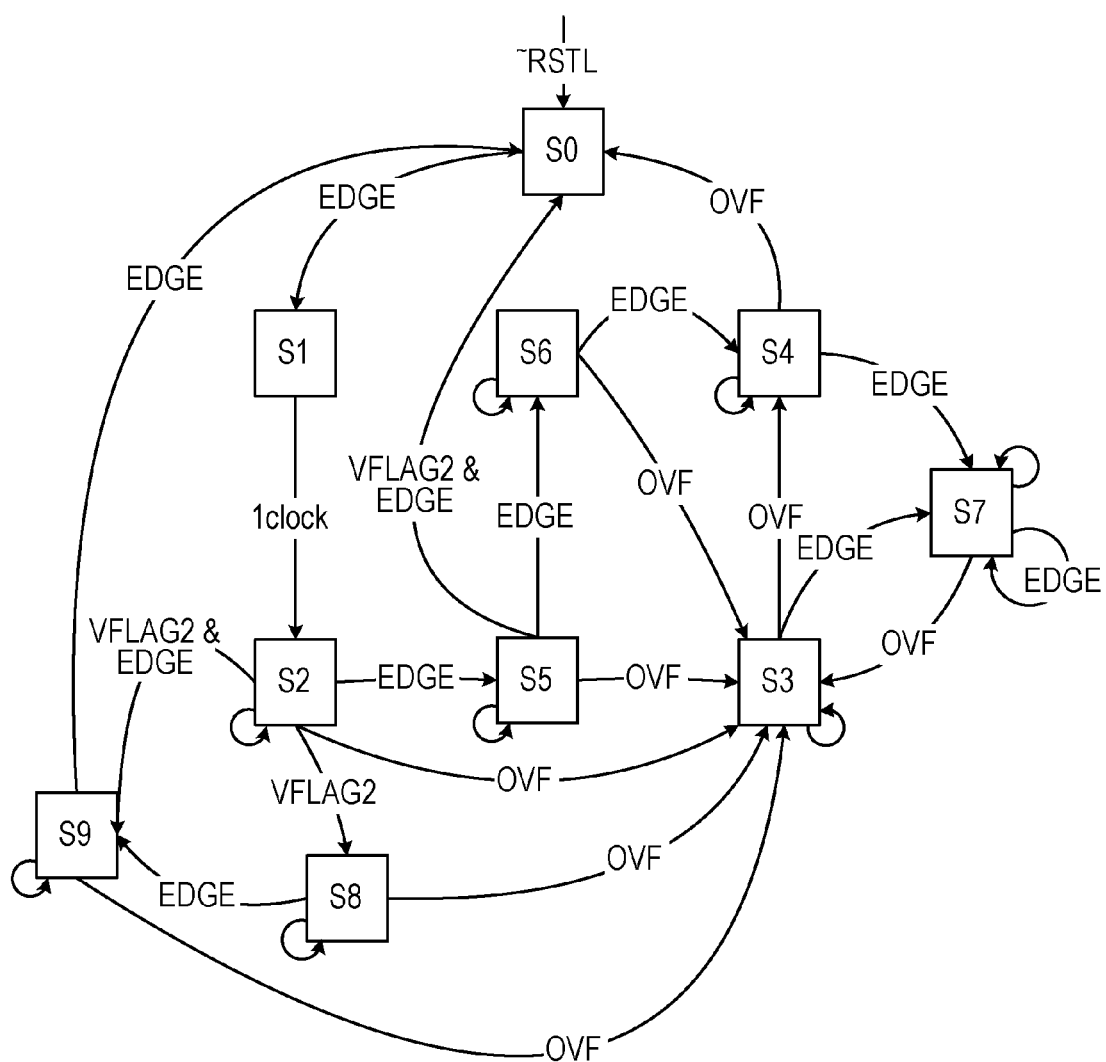
FIG. 16 is a diagram illustrating state transitions of a signal generator illustrated in FIG. 15.

The signal generator 52A makes the transition of its own state between a state S0 to a state S9 based on the edge detection information Sedg, the overflow information Sovf, and the direction inversion information Svflag. FIG. 16 is a diagram illustrating the state transitions of the signal generator 52A. Here, in FIG. 16, the notification of the overflow information Sovf is denoted by OVF, the notification of the edge detection information Sedg is denoted by EDGE, and the notification of the direction inversion information Svflag is denoted by VFLAG2.

As illustrated in FIG. 16, the signal generator 52A transitions to the state S1 when the edge detection information Sedg is notified in the state S0. Accordingly, the commutation control is started. The state S0 denotes the standby state where the commutation control is not performed. Subsequently, the signal generator 52A transitions to the state S2 with the next one clock. After the transition to the state S2, the signal generator 52A acquires the information of the first step from the step-information notifier 51A. Furthermore, the signal generator 52A changes the states of the drive signals Sg1o to Sg6o based on the information of the first step.

Subsequently, the signal generator 52A sequentially transitions from the state S2 to the state S3, from the state S3 to the state S4, and from the state S4 to the state S0 every time the overflow information Sovf is notified. Every transition of the state, the signal generator 52A sequentially acquires the information of the second step, the information of the third step, and the information of the fourth step from the step-information notifier 51A. Furthermore, the signal generator 52A sequentially changes the states of the drive signals Sg1o to Sg6o based on the acquired information. Accordingly, the input phase voltage to be output to the output phase is switched and then the commutation control terminates. Here, the signal generator 52A can also transition directly from the state S0 to the state S2.

On the other hand, the signal generator 52A transitions to any of the state S5, the state S8, and the state S9 when information other than the overflow information Sovf is notified in the state S2. Specifically, the signal generator 52A transitions from the state S2 to the state S5 when the edge detection information Sedg is notified. When the edge detection information Sedg and the direction inversion information Svflag are notified at the timing of the transition from the state S1 to the state S2, the signal generator 52A transitions from the state S2 to the state S9. When only the direction inversion information Svflag is notified at this timing, the signal generator 52A transitions from the state S2 to the state S8.

When the edge detection information Sedg is notified in the states S3 and S4, the signal generator 52A transitions to the state S7.

In the state S5, the signal generator 52A transitions to any of the state S3, the state S6, and the state S0 based on the information to be notified. Specifically, the signal generator 52A transitions from the state S5 to the state S3 when the overflow information Sovf is notified. The signal generator 52A transitions from the state S5 to the state S6 when the edge detection information Sedg is notified. When the edge detection information Sedg and the direction inversion information Svflag are notified, the signal generator 52A transitions from the state S5 to the state S0.

In the state S6, the signal generator 52A transitions to the state S3 or the state S4 based on the information to be notified. Specifically, the signal generator 52A transitions from the state S6 to the state S3 when the overflow information Sovf is notified and transitions from the state S6 to the state S4 when the edge detection information Sedg is notified.

In the state S7, when the overflow information Sovf is notified, the signal generator 52A transitions from the state S7 to the state S3. Here, in the case where the edge detection information Sedg is notified in the state S7, the signal generator 52A does not make the transition of the state.

In the state S8, the signal generator 52A transitions to the state S3 or the state S9 based on the information to be notified. Specifically, the signal generator 52A transitions from the state S8 to the state S3 when the overflow information Sovf is notified and transitions from the state S8 to the state S9 when the edge detection information Sedg is notified.

In the state S9, the signal generator 52A transitions to the state S0 or the state S3 based on the information to be notified. Specifically, the signal generator 52A transitions from the state S9 to the state S3 when the overflow information Sovf is notified and transitions from the state S9 to the state S0 when the edge detection information Sedg is notified.

Thus, the signal generator 52A transitions to the state corresponding to the information to be notified. Furthermore, the signal generator 52A acquires the information corresponding to the state after the transition from the step-information notifier 51A and changes the states of the drive signals Sg1o to Sg6o based on the acquired information.

For example, the signal generator 52A acquires the information of the first to fourth steps as the information corresponding to the respective states S2, S3, S4, and S0 from the step-information notifier 51A. Additionally, the signal generator 52A acquires information of a first handover step as the information corresponding to the states S5 to S7 from the step-information notifier 51A. The signal generator 52A acquires information of a second handover step as the information corresponding to the state S9 from the step-information notifier 51A. Here, in the transitions to the states S1 and S8, the signal generator 52A does not acquire the information from the step-information notifier 51A and does not change the states of the drive signals Sg1o to Sg6o.

Here, with reference to FIG. 17 to FIG. 19, a description will be given of the transitions between the commutation controls in the case where the edge detection information Sedg is notified in each of the states S2, S3, and S4. Here, in the state where Er>Es>Et, the input phase voltage to be output to the output phase by the PWM voltage command Vo1* is assumed to change from Er to Es and further change from Es to Et.

Figure 17:
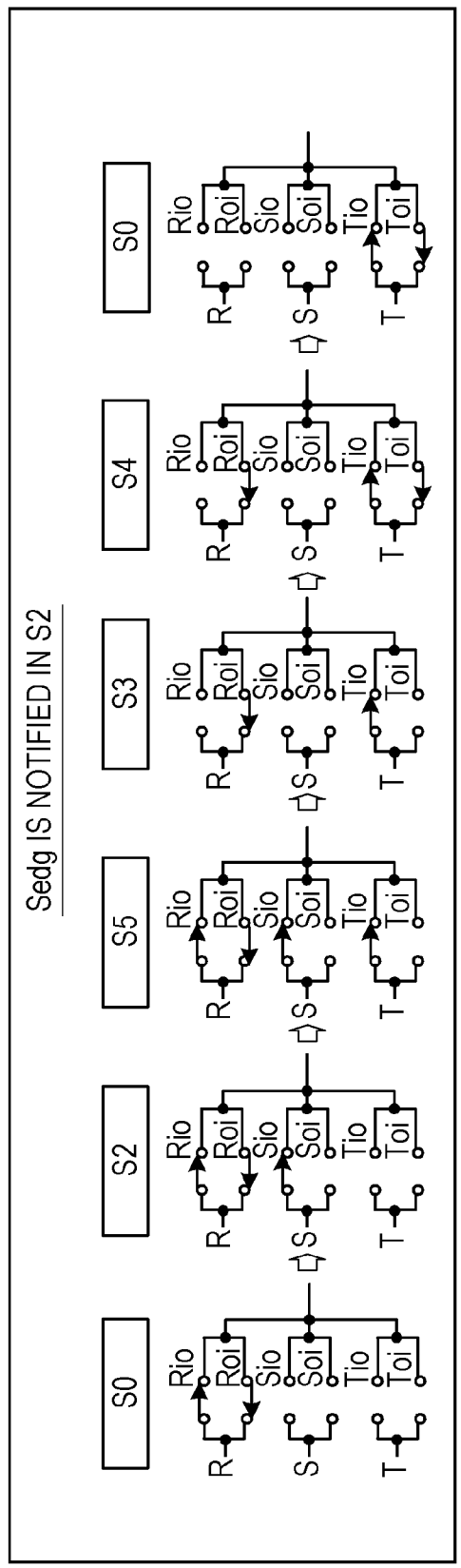
FIG. 17 is a diagram illustrating state transitions of the bidirectional switches in the case where edge detection information is notified in a state S2.

FIG. 17 is a diagram illustrating the state transitions of the bidirectional switch S in the case where the edge detection information Sedg is notified in the state S2. As illustrated in FIG. 17, the signal generator 52A transitions to the state S5 when the edge detection information Sedg is notified in the state S2. Furthermore, the signal generator 52A turns on the switching element Tio based on the information of the first handover step. Subsequently, when the overflow information Sovf is notified, the signal generator 52A transitions to the state S3 and turns off the switching element Sio.

Even when the switching element Sio is turned off in the state S3, the switching element Tio that has the conducting direction of the same polarity as the polarity of the output electric current Io keeps turned on. Accordingly, circuit opening of the output phase and a short circuit of the input phase do not occur. Thus, this reduces deterioration in precision of the output voltage. On the other hand, when the transition from the state S2 to the state S3 is made without the state S5, in the case where the turn-off time of the switching element Rio is shorter than the turn-on time of the switching element Tio, circuit opening of the output phase occurs.

Figure 18:
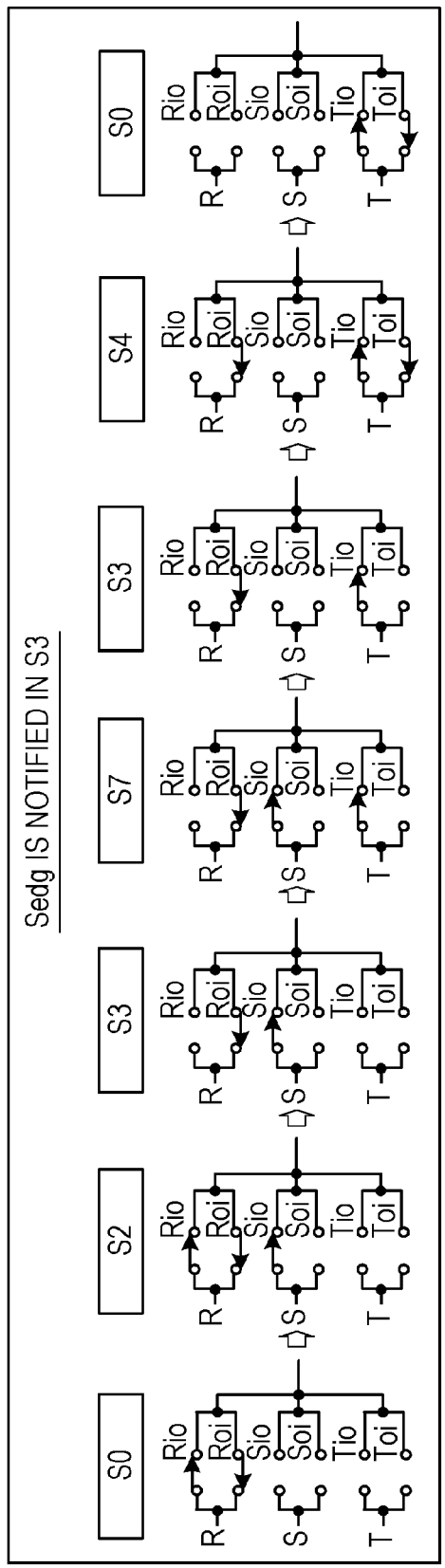
FIG. 18 is a diagram illustrating state transitions of the bidirectional switches in the case where the edge detection information is notified in a state S3.

FIG. 18 is a diagram illustrating the state transitions of the bidirectional switch S in the case where the edge detection information Sedg is notified in the state S3. FIG. 19 is a diagram illustrating the state transitions of the bidirectional switch S in the case where the edge detection information Sedg is notified in the state S4.

Figure 19:
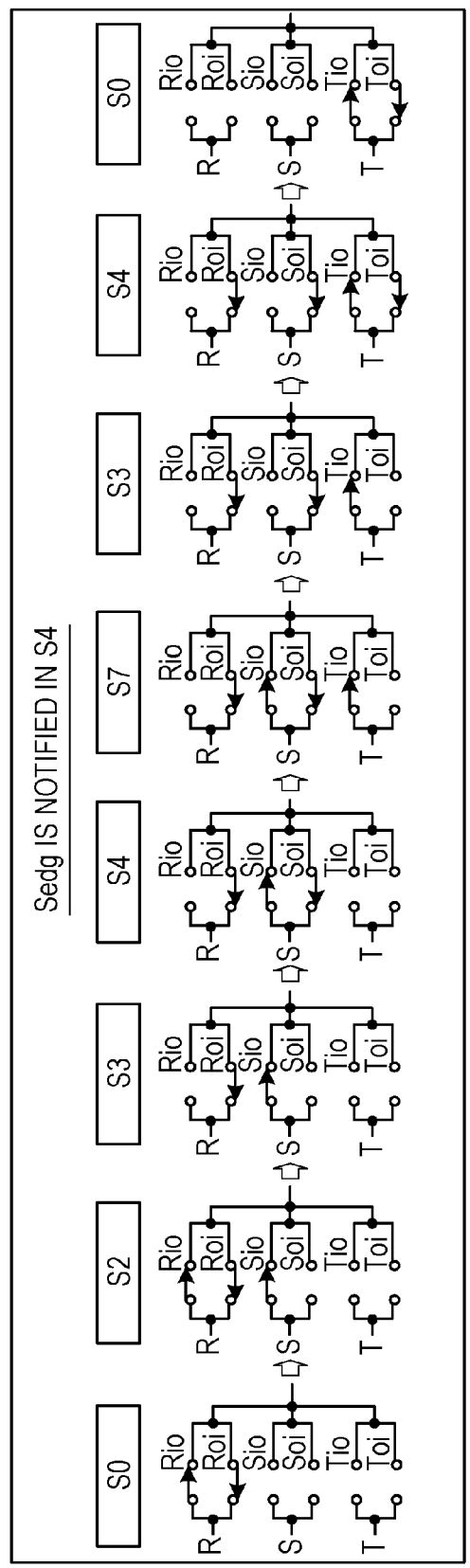
FIG. 19 is a diagram illustrating state transitions of the bidirectional switches in the case where the edge detection information is notified in a state S4.

As illustrated in FIG. 18 and FIG. 19, when the edge detection information Sedg is notified in the state S3 or the state S4, the signal generator 52A transitions to the state S7 and turns on the switching element Tio. In the state S7, when the overflow information Sovf is notified, as illustrated in FIG. 18 and FIG. 19, the signal generator 52A transitions to the state S3 and turns off the switching element Sio. Accordingly, similarly to the case in FIG. 17, circuit opening of the output phase and a short circuit of the input phase do not occur, and this allows reducing deterioration in precision of the output voltage.

The following describes the transitions between the commutation controls in the case where the edge detection information Sedg and the direction inversion information Svflag are notified with reference to FIG. 20 to FIG. 24.

Switching of the input phase voltage to be output to the output phase other than switching illustrated in FIG. 4 is performed for switching from the maximum input phase voltage Ep to the minimum input phase voltage En and for switching from the minimum input phase voltage En to the maximum input phase voltage Ep.

Figure 20:
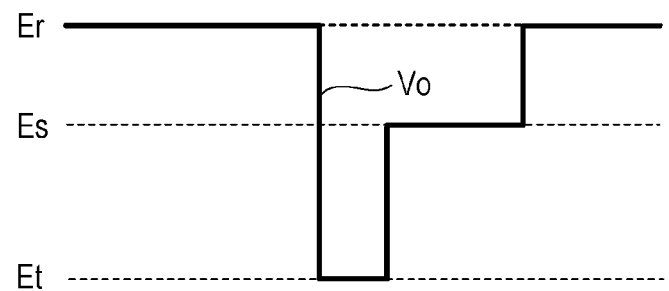
FIG. 20 is a diagram illustrating a state where the input phase voltage to be output to the output phase is switched.

FIG. 20 is a diagram illustrating the state where the input phase voltage to be output to the output phase is switched from Er to Et to Es to Er in the case where Er>Es>Et. The state illustrated in FIG. 20 is executed by switching the specified voltage of the PWM voltage command Vo1* from Er to Et to Es to Er.

Figure 21:
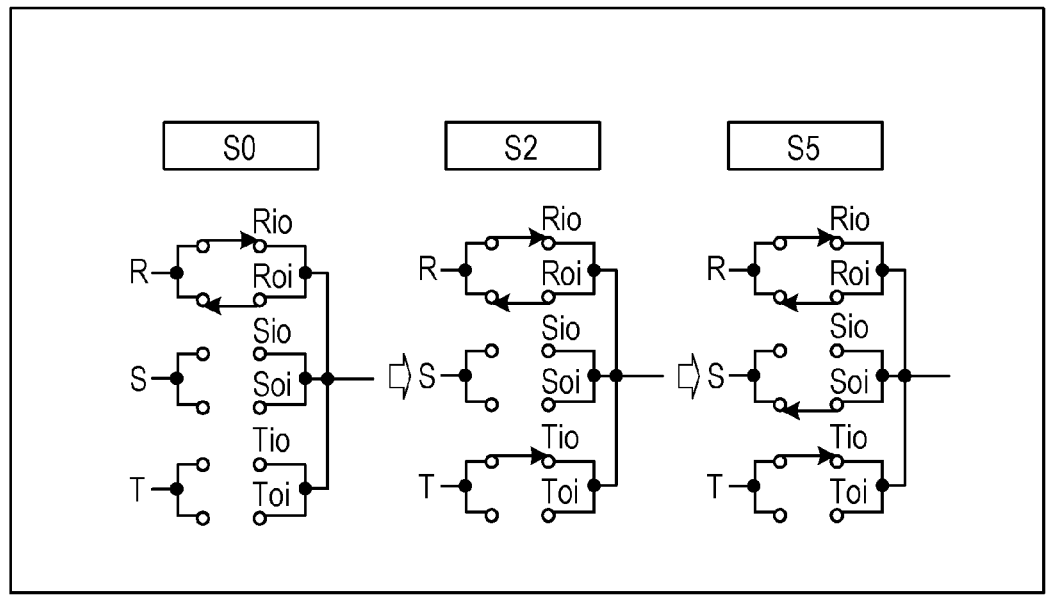
FIG. 21 is a diagram illustrating exemplary state transitions of the bidirectional switches in which a short circuit occurs between input phases.

In the switching control as illustrated in FIG. 20, during execution of the commutation control corresponding to the change of the specified voltage of the PWM voltage command Vo1* from Er to Et, the specified voltage of the PWM voltage command Vo1* might change from Et to Es. In this case, when the same switching element (the switching element specified by the first handover step) as that of an ordinary commutation control is turned on, for example, in the case where the transition is made from the state S2 to the state S5, the state as illustrated in FIG. 21 occurs. FIG. 21 is a diagram illustrating exemplary state transitions of the bidirectional switch S in which a short circuit occurs between input phases.

In the state illustrated in FIG. 21, since the two switching elements Rio and Soi are turned on in the state S5, a short circuit occurs between the R-phase and the S-phase. When this short circuit occurs between the input phases, deterioration in precision of the output voltage occurs. Therefore, in the case where the specified voltage changes from En to Ep, the second detector 41 gives notice of the direction inversion information Svflag to the signal generator 52A.

When the edge detection information Sedg and the direction inversion information Svflag are notified in the state S2, as illustrated in FIG. 16, the signal generator 52A transitions to the state S9. After the transition to the state S9, the signal generator 52A acquires the info' lotion of the second handover step from the step-information notifier 51A, and changes the states of the drive signals Sg1o to Sg6o based on the acquired information.

Figure 22:
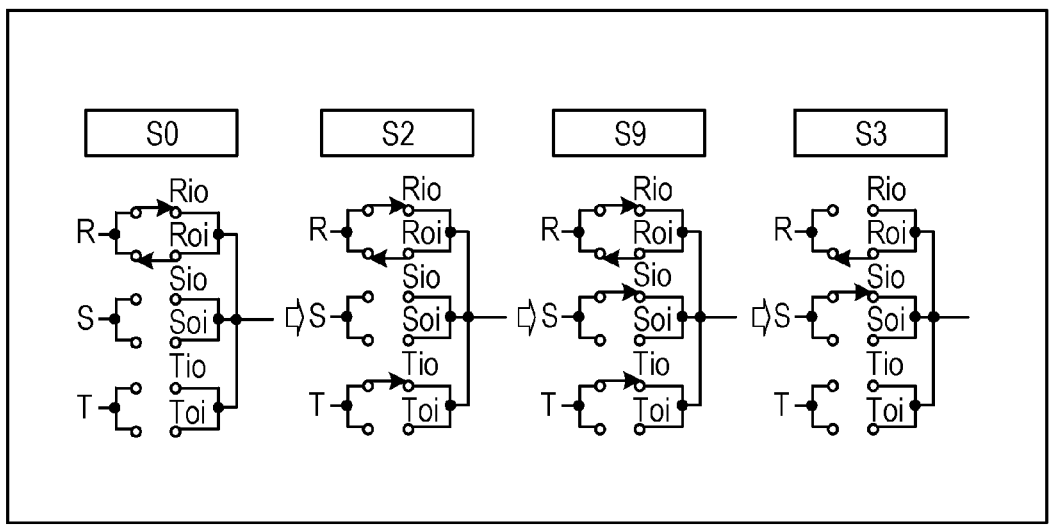
FIG. 22 is a diagram illustrating state transitions of the bidirectional switches in the case where the edge detection information and direction inversion information are notified in the state S2 and the state transitions to a state S9.

FIG. 22 is a diagram illustrating the state transitions of the bidirectional switch S in the case where the edge detection information Sedg and the direction inversion information Svflag are notified in the state S2 and the transition to the state S9 is made. As illustrated in FIG. 22, in the state S9, the switching element Sio to be inversely biased in the switching elements Sio and Soi that constitute the bidirectional switch S to be a switching destination is turned on. This allows suppressing the short circuit between the input phases.

Figure 23:
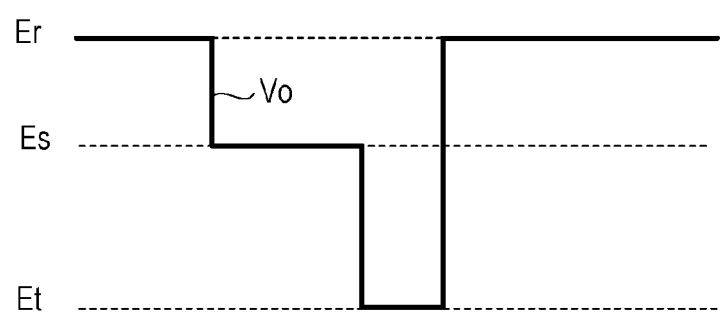
FIG. 23 is a diagram illustrating a state where the input phase voltage to be output to the output phase is switched.

FIG. 23 is a diagram illustrating the state where the input phase voltage to be output to the output phase is switched from Er to Es to Et to Er in the case where Er>Es>Et. The state illustrated in FIG. 23 is executed by switching the specified voltage of the PWM voltage command Vo1* from Er to Es to Et to Er.

In the switching control as illustrated in FIG. 23, during execution of the commutation control corresponding to the change of the specified voltage of the PWM voltage command Vo1* from Es to Et, the specified voltage of the PWM voltage command Vo1* might change from Et to Er. In this case, when the edge detection information Sedg and the direction inversion information Svflag are notified in the state S5, the signal generator 52A transitions from the state S5 to the state S0 without the transition from the state S5 to the state S6. This allows quick switching of the commutation control.

Figure 24:
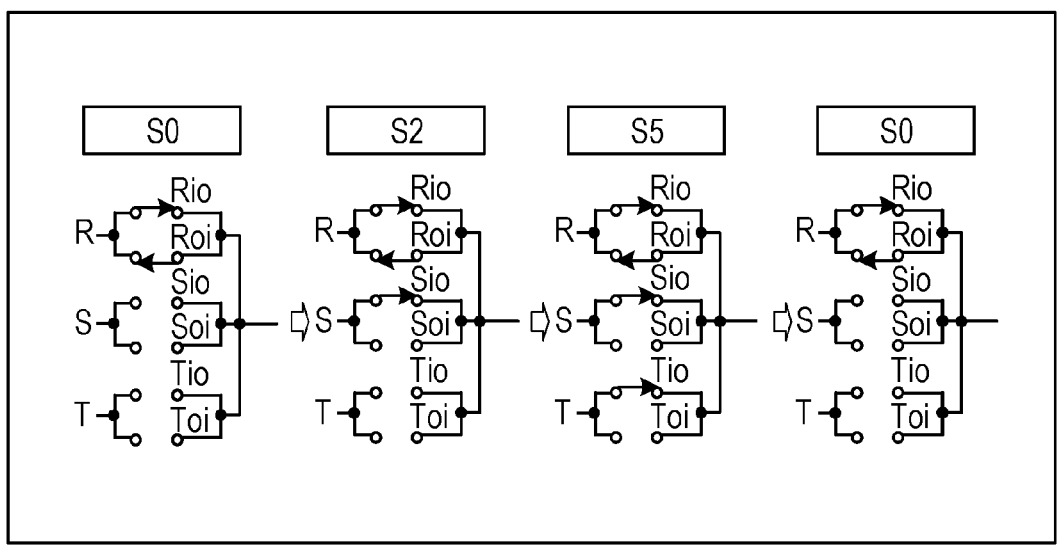
FIG. 24 is a diagram illustrating state transitions of the bidirectional switches in the case where the edge detection information and the direction inversion information are notified in a state S5 and the state transitions to a state S0.

FIG. 24 is a diagram illustrating the state transitions of the bidirectional switch S in the case where the edge detection information Sedg and the direction inversion information Svflag are notified in the state S5 and the transition to the state S0 is made. As illustrated in FIG. 24, the state S5 includes the state of the bidirectional switch S in the state S0 when the next commutation control terminates. Accordingly, in the state S5, simply turning off the switching elements Sio and Tio allows the next commutation control to terminate.

As described above, in the case where the PWM voltage command Vo1* changes during execution of the commutation control, the commutation controller 32A executes the handover step that turns on one switching element that constitutes the bidirectional switch S to be a switching destination in the next commutation control. Subsequently, the commutation controller 32A executes the next commutation control the step in the course of the control. Accordingly, the commutation controller 32A can perform switching of the commutation control while reducing deterioration in precision of the output voltage due to commutation failure even after the commutation control is started.

Additionally, the commutation controller 32A changes the conducting direction of the bidirectional switch S in the handover step, corresponding to the input phase voltage of the switching source and the input phase voltage of the switching destination in the commutation control. For example, the commutation controller 32A changes the conducting direction of the bidirectional switch S of the switching destination in the handover step between: the case where the input phase voltage of the switching source is Ep and the input phase voltage of the switching destination is En, and the case where the input phase voltage of the switching source is Ep and the input phase voltage of the switching destination is Em. This allows suppressing the short circuit between the input phases.

Here, the power converter 10 is exemplary power conversion means. The PWM-duty-ratio operator 31 is exemplary command generating means. The commutation controller 32 is exemplary commutation control means.

The matrix converter according to one embodiment of this disclosure may be the following first to eighth matrix converters.

The first matrix converter includes a power converter, a command generator, and a commutation controller. The power converter includes a plurality of bidirectional switches configured to control a conducting direction using a plurality of switching elements. The plurality of bidirectional switches are disposed between: a plurality of input terminals to be coupled to respective phases of an AC power supply; and a plurality of output terminals to be coupled to respective phases of a load. The command generator is configured to generate a control command for a PWM control on the plurality of switching elements. The commutation controller is configured to perform a commutation control by controlling the plurality of switching elements with a commutation pattern having a plurality of steps in the case where the control command changes. In the case where the control command changes during execution of the commutation control, the commutation controller executes a handover step that turns on one of the switching elements that constitute the bidirectional switch to be a switching destination of the next commutation control and then executes the next commutation control from a step in the course of the next commutation control.

In the second matrix converter according to the first matrix converter, the commutation controller includes: a detector configured to detect a change of the control command; a timer configured to time a preliminarily set step time; and a switcher configured to sequentially switch and execute the plurality of steps for each lapse of the step time in the case where the matrix converter detects a change of the control command in a state where the matrix converter is not executing the commutation control. In the case where the detector detects a change of the control command during execution of the commutation control, the switcher executes the handover step and then executes the next commutation control from a step in the course of the next commutation control.

In the third matrix converter according to the second matrix converter, the commutation pattern is a four-step commutation pattern corresponding to a polarity of an output electric current from the power converter. In the case where a timing when the control command changes is a state in the second step or the third step of the commutation pattern, the switcher executes the handover step and then executes the next commutation control from the third step of the commutation pattern.

In the fourth matrix converter according to the third matrix converter, in the case where a timing when the control command changes is a state in the first step of the commutation pattern, the switcher executes the next commutation control from the second step of the commutation pattern without the handover step.

In the fifth matrix converter according to the second matrix converter, the commutation pattern is a four-step commutation pattern corresponding to a magnitude relationship of phase voltages of the AC power supply. In the case where a timing when the control command changes is a state in the second step or the third step of the commutation pattern, the switcher executes the handover step and then executes the next commutation control from the second step of the commutation pattern.

In the sixth matrix converter according to the fifth matrix converter, in the case where a timing when the control command changes is a state in the first step of the commutation pattern, the switcher executes the handover step and then executes the next commutation control from the second step of the commutation pattern.

In the seventh matrix converter according to the fifth or sixth matrix converter, in the commutation control, the switcher changes a conducting direction of the bidirectional switch in the handover step, corresponding to the phase voltage of the AC power supply in a switching source and the phase voltage of the AC power supply in a switching destination.

The eighth matrix converter includes a power converter, a command generator, and a commutation controller. The power converter includes a plurality of bidirectional switches configured to control a conducting direction using a plurality of switching elements. The plurality of bidirectional switches are disposed between: a plurality of input terminals to be coupled to respective phases of an AC power supply; and a plurality of output terminals to be coupled to respective phases of a load. The command generator is configured to generate a control command for a PWM control on the plurality of switching elements. The commutation controller is configured to perform a commutation control by controlling the plurality of switching elements with a commutation pattern having a plurality of steps in the case where the control command changes. In the case where the control command changes during execution of the commutation control, the commutation controller executes a handover step for handover to the next commutation control and then executes the next commutation control from a step in the course of the next commutation control.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general concept of the disclosure as defined by the appended claims and their equivalents.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A matrix converter, comprising:
 a power convertor that includes:
  a plurality of input terminals to be coupled to respective phases of an AC power supply;
  a plurality of output terminals to be coupled to respective phases of a load; and
  a plurality of bidirectional switches disposed between the input terminals and the output terminals, the bidirectional switch being configured to control a conducting direction using a plurality of switching elements;
 a command generator configured to generate a control command for a PWM control on the plurality of switching elements; and
 a commutation controller configured to perform a commutation control on the plurality of bidirectional switches by controlling the plurality of switching elements with a commutation pattern having a plurality of steps in a case where the control command changes, wherein
 in a case where the control command changes during execution of the commutation control, the commutation controller executes a handover step for handover to a next commutation control and then executes the next commutation control from a step in a course of the next commutation control, and wherein
 the commutation pattern including the handover step is a different course of commutation control as compared to a course of commutation control executed by the commutation controller in a case where the control command does not change during execution of the commutation control.

2. The matrix converter according to claim 1, wherein
in the handover step, the commutation controller turns on one of the switching elements that constitute the bidirectional switch to be a switching destination of the next commutation control.

3. The matrix converter according to claim 2, wherein
the commutation controller includes:
 a detector configured to detect a change of the control command;
 a timer configured to time a preliminarily set step time; and
 a switcher configured to sequentially switch the plurality of steps for each lapse of the step time in a case where the matrix converter detects a change of the control command in a state where the matrix converter is not executing the commutation control, wherein
in a case where the detector detects a change of the control command during execution of the commutation control, the switcher executes the handover step and then executes the next commutation control from a step in a course of the next commutation control.

4. The matrix converter according to claim 3, wherein
the commutation pattern includes following first to fourth steps corresponding to a polarity of an output electric current from the power convertor:
 first step: the matrix converter turns off a switching element that has a conducting direction of a reversed polarity to the polarity of the output electric current among the switching elements that constitute the bidirectional switch of a switching source;
 second step: the matrix converter turns on a switching element that has a conducting direction of a same polarity as the polarity of the output electric current among the switching elements that constitute the bidirectional switch of a switching destination;
 third step: the matrix converter turns off a switching element that has a conducting direction of a same polarity as the polarity of the output electric current among the switching elements that constitute the bidirectional switch of a switching source; and fourth step: the matrix converter turns on a switching element that has a conducting direction of a reversed polarity to the polarity of the output electric current among the switching elements that constitute the bidirectional switch of a switching destination.

5. The matrix converter according to claim 4, wherein in a case where a timing when the control command changes is a state in the second step or the third step of the commutation pattern, the switcher executes the handover step and then executes the next commutation control from the third step of the commutation pattern.

6. The matrix converter according to claim 4, wherein in a case where a timing when the control command changes is a state in the first step of the commutation pattern, the switcher executes the next commutation control from the second step of the commutation pattern without the handover step.

7. The matrix converter according to claim 3, wherein the commutation pattern includes following first to fourth steps corresponding to a magnitude relationship of phase voltages of the AC power supply:
first step: the matrix converter turns on a switching element to be inversely biased in the bidirectional switch of a switching destination;
second step: the matrix converter turns off a switching element to be inversely biased in the bidirectional switch of a switching source;
third step: the matrix converter turns on a switching element to be forward biased in the bidirectional switch of a switching destination; and
fourth step: the matrix converter turns off a switching element to be forward biased in the bidirectional switch of a switching source.

8. The matrix converter according to claim 7, wherein in a case where a timing when the control command changes is a state in the second step or the third step of the commutation pattern, the switcher executes the handover step and then executes the next commutation control from the second step of the commutation pattern.

9. The matrix converter according to claim 7, wherein in a case where a timing when the control command changes is a state in the first step of the commutation pattern, the switcher executes the handover step and then executes the next commutation control from the second step of the commutation pattern.

10. The matrix converter according to claim 8, wherein in the commutation control, the switcher changes a conducting direction of the bidirectional switch in the handover step, corresponding to the phase voltage of the AC power supply in a switching source and the phase voltage of the AC power supply in a switching destination.

11. The matrix converter according to claim 9, wherein in the commutation control, the switcher changes a conducting direction of the bidirectional switch in the handover step, corresponding to the phase voltage of the AC power supply in a switching source and the phase voltage of the AC power supply in a switching destination.

12. A matrix converter, comprising:
command generating means for generating a control command for a PWM control on the plurality of switching elements disposed between respective phases of an AC power supply and respective phases of a load; and
commutation control means for performing a commutation control on the plurality of bidirectional switches by controlling the plurality of switching elements with a commutation pattern having a plurality of steps in a case where the control command changes, wherein
in a case where the control command changes during execution of the commutation control, the commutation control means executes a handover step for handover to a next commutation control and then executes the next commutation control from a step in a course of the next commutation control, wherein
the commutation pattern including the handover step executed by the commutation control means is a different course of commutation control as compared to a course of commutation control executed by the commutation control means in a case where the control command does not change during execution of the commutation control.

13. The matrix converter according to claim 1, wherein the commutation pattern includes first to fourth steps, the handover step constituting a fifth step in addition to the four steps of the commutation pattern.

14. The matrix converter according to claim 12, wherein the commutation pattern includes first to fourth steps, the handover step constituting a fifth step in addition to the four steps of the commutation pattern.

15. The matrix converter according to claim 13, wherein in the transition from the handover step to the step in the course of the next commutation control, the matrix converter simultaneously changes the states of a plurality of switching elements.

16. The matrix converter according to claim 14, wherein in the transition from the handover step to the step in the course of the next commutation control, the matrix converter simultaneously changes the states of a plurality of switching elements.

* * * * *